Feb. 3, 1970  B. J. SEARS  3,492,797
CORN HARVESTING UNIT
Filed Aug. 14, 1967  4 Sheets-Sheet 1
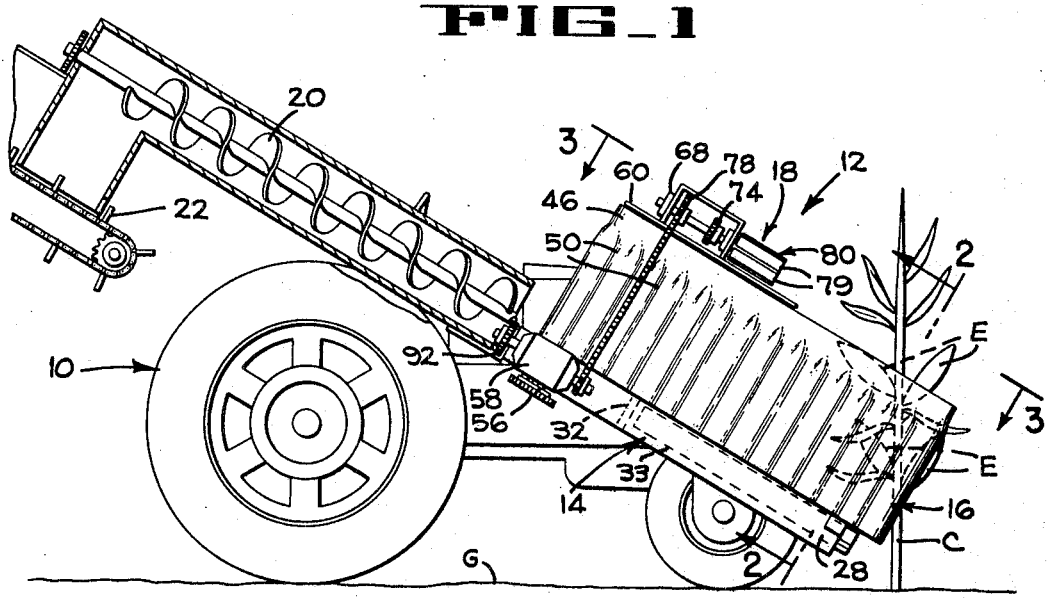
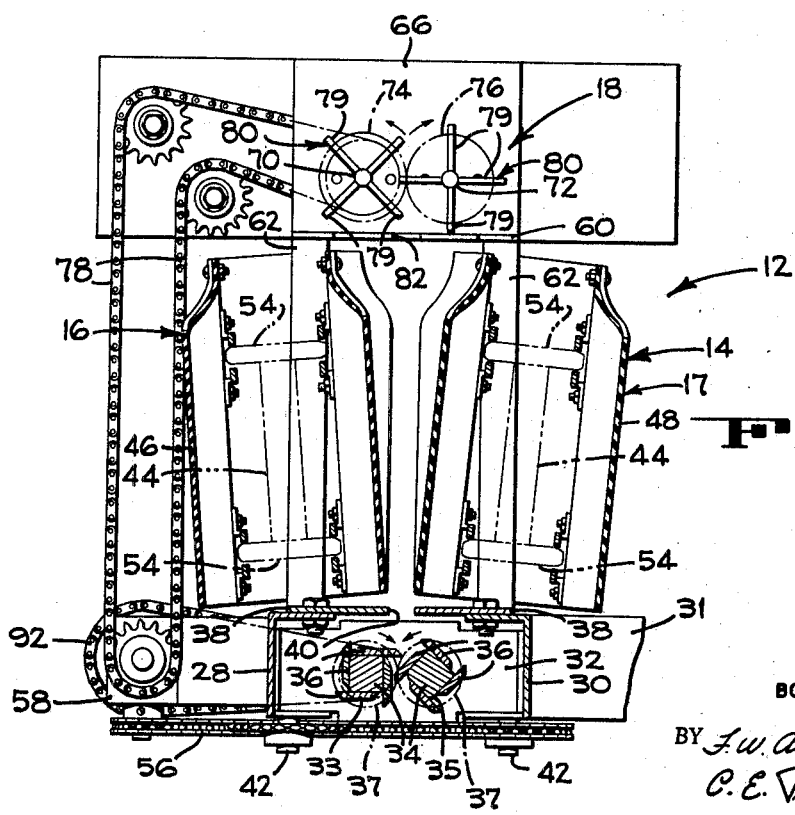
INVENTOR.
BOBBY JOE SEARS
BY F. W. Anderson
C. E. Tripp
ATTORNEYS

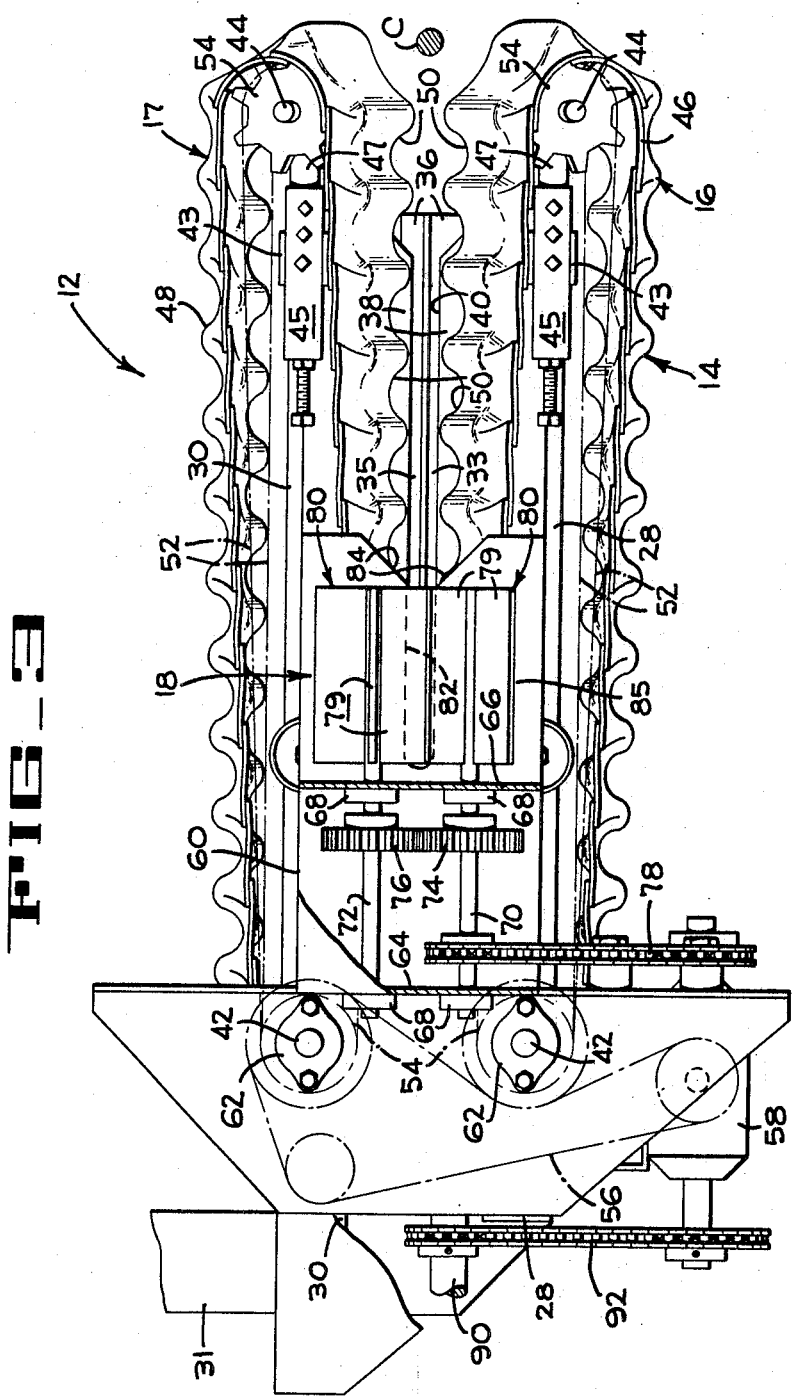

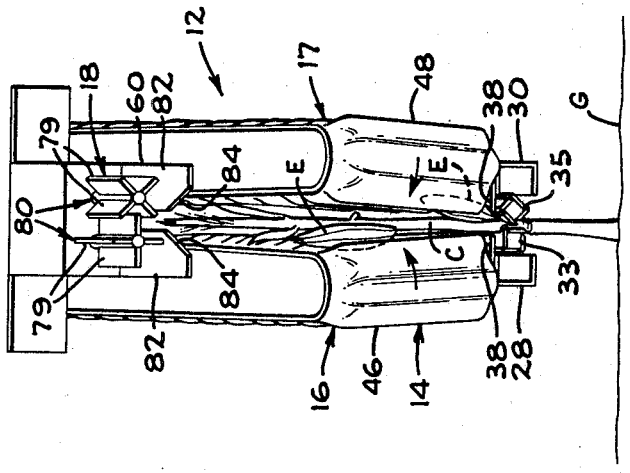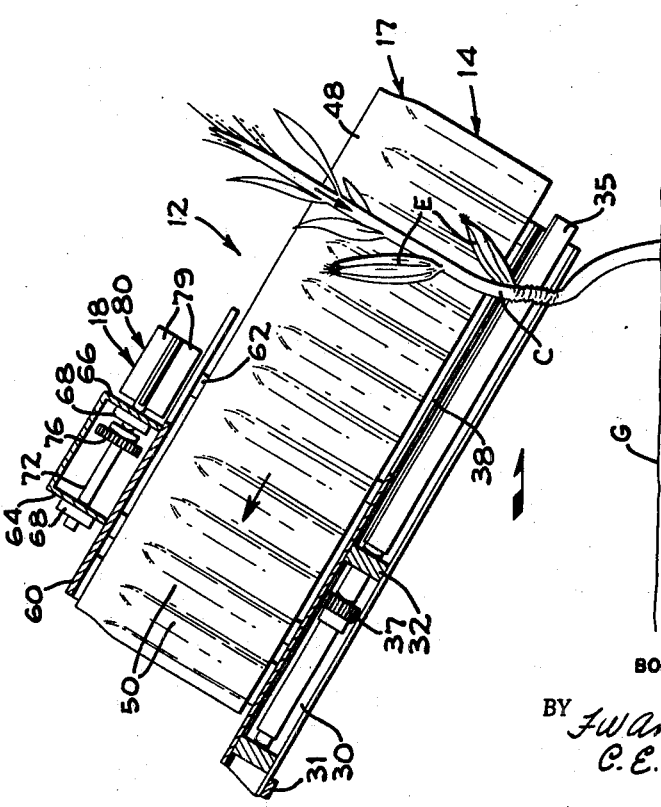

Feb. 3, 1970  B. J. SEARS  3,492,797
CORN HARVESTING UNIT
Filed Aug. 14, 1967  4 Sheets-Sheet 4
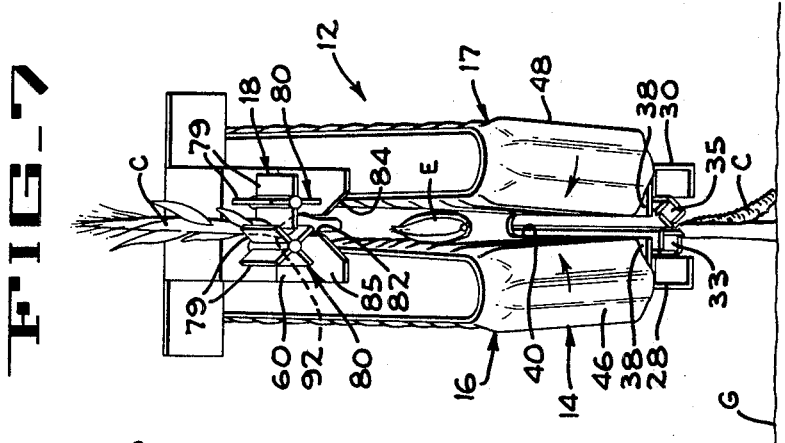
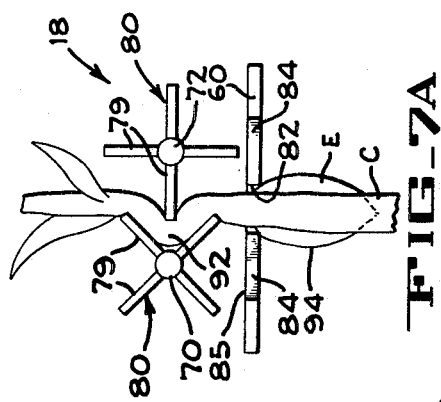
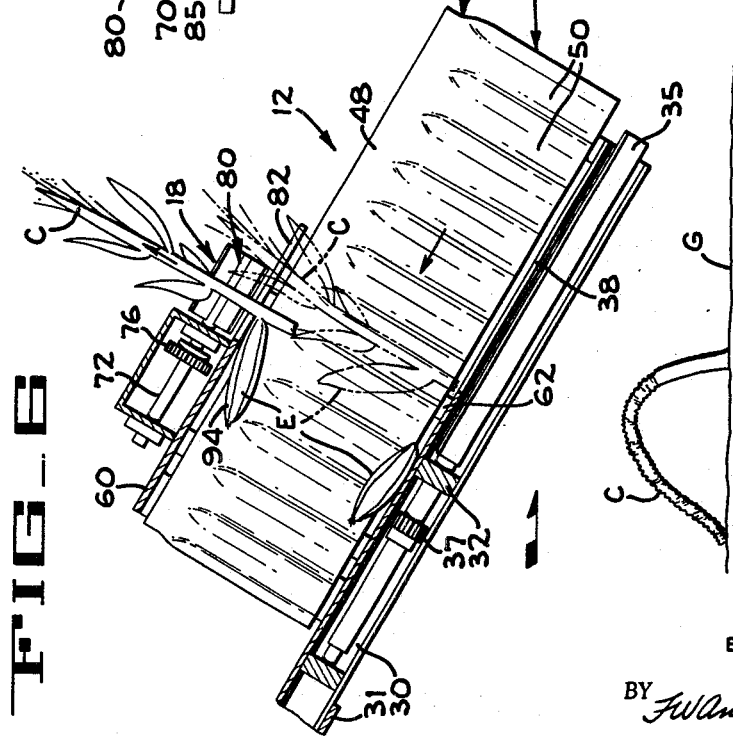
INVENTOR.
BOBBY JOE SEARS
BY
ATTORNEYS

United States Patent Office 3,492,797
Patented Feb. 3, 1970

3,492,797
CORN HARVESTING UNIT
Bobby Joe Sears, Hoopeston, Ill., assignor to FMC Corporation, San Jose, Calif., a corporation of Delaware
Filed Aug. 14, 1967, Ser. No. 660,357
Int. Cl. A01d *45/02*
U.S. Cl. 56—15                                      1 Claim

ABSTRACT OF THE DISCLOSURE

Counter-rotating intermeshing paddles are located above and rearward of the snapping rolls or knife-blade rotors in a corn harvesting machine to engage and conjointly eject broken stalks upwardly out of the machine. Cooperatively arranged with the paddles is an underlying stripper plate with a guide slot for directing the stalks to the paddles and for arresting any ears which may be attached to the broken stalks; as a result, only the stalks are ejected while the ears are stripped off to drop back into the harvesting machine.

BACKGROUND OF THE INVENTION

The field of art to which the present invention pertains is mobile harvesting machines, and more particularly to corn harvesting machines incorporating means for diverting or ejecting broken cornstalks and for harvesting ears which might be carried by the broken stalks. One such prior art harvesting machine is disclosed in Aasland 2,651,163 in which broken cornstalks that cannot be harvested of ears, in the usual manner, are gripped between driven, elevated stalk ejector rolls and carried upward past stripper plates which underlie the rolls. Any ears attached to the broken stalk are removed when the ears are arrested by either the stripper plates or the stalk ejector rolls. The thus reclaimed ears fall back onto the main stripper rolls, or onto gathering chains having pusher fingers, and are moved rearward in the machine by the pusher fingers to be processed with the normally harvested ears.

SUMMARY OF THE INVENTION

A drawback common to some of the corn harvesting machines currently in use results from the corn stalks occasionally breaking in the harvesting operation. When this occurs, ears which may still be attached to the stalk are difficult to reclaim. Also, the broken stalks and ears may cause jamming of the machine because they are not under positive control, thus necessitating frequent manual cleanout before the machine can be structurally damaged. In the type of corn harvesting machine specifically referred to herein, the stalks are straddled near the ground by counter-rotating knife rotors that chop into the stalk and pull it downward through a slot in a stripper plate. The base ends of the ears attached to the stalks eventually are cut by the knife rotors if the stalk does not break above the rotors. However, a stalk may be so brittle or weak at some point that it will break above the location of the knives. This may happen when the remaining stalk above the knives is relatively long and carries several unharvested ears. As a result, the broken stalk and ears are conveyed rearwardly in the machine through the zone normally occupied by only individual harvested ears. The stalk is thus forced through mechanical elements intended only for the conveying of the harvested ears and may cause jamming which destroys not only the ears it carries, but other ears as well. The general problem, then, is to remove broken stalks before they reach the zone of the machine occupied, normally, by only the harvested individual ear. A related problem is to not only remove the broken stalk, but to first reclaim or harvest its ears, because they would otherwise be lost. It is also important to return the ears reclaimed from broken stalks into the normal flow path without damage.

The present invention provides stalk ejecting and ear harvesting apparatus which, in effect, is an auxiliary corn harvesting mechanism superposed above and slightly rearward of the main harvesting mechanism, and operating in a reverse direction so that any stalks which become severed above the main mechanism are engaged by the auxiliary mechanism and are stripped of ears and ejected upwardly from the machine. The main harvesting mechanism is formed of counter-rotating knife-blade rotors that are provided with overlying stripper plates which prevent damage to the reclaimed ears which would otherwise occur if the ears dropped back into the rotors. In conjunction with upstanding resilient belt flights that convey the ears, the stripper plates are part of an upwardly open chamber having no protrusions or moving metallic parts which might damage the ears.

BRIEF DESCRIPTION OF THE DRAWINGS

FIGURE 1 is a schematic elevation, partly broken away, of a corn harvesting machine of the type mounted on a farm tractor, and embodying the stalk-ejecting mechanism of the present invention for ejecting broken stalks after harvesting ears therefrom.

FIGURE 2 is a section taken along lines 2—2 on FIGURE 1.

FIGURE 3 is an enlarged plan viewed in the direction of the arrows 3—3 on FIGURE 1.

FIGURE 4 is a schematic fragmentary section illustrating the operation of the corn picking head and its stalk ejecting mechanism.

FIGURE 5 is a schematic front elevation of the complete picking head shown in FIGURE 4, and in the same operational position relative to a corn stalk being harvested.

FIGURES 6 and 7 respectively illustrate the same mechanism shown in FIGURES 4 and 5, but in a different operational position in relation to the corn stalk.

FIGURE 7A is an enlarged fragmentary elevation taken in the direction of the arrows 7A—7A on FIGURE 6.

DESCRIPTION OF THE PREFERRED EMBODIMENT

FIGURE 1 illustrates a conventional farm tractor 10 and the right-hand one of two corn harvesting mechanisms 12 which are mounted alongside in straddling relation to the body of the tractor. The left-hand harvesting mechanism is of similar but opposite construction. Each harvesting mechanism is adjustably laterally spaced from the longitudinal centerline of the tractor in alignment with a row of corn so that two rows of corn are simultaneously harvested.

The corn harvesting mechanism 12 includes a picking head 14 that operates in conjunction with cooperating corrugated gathering belt assemblies 16 and 17 (FIGURE 2) and a stalk ejector mechanism 18 to grip a cornstalk C, remove the ears of corn E, deposit the stalks on the ground G and deliver the harvested ears to a screw conveyor 20. From the screw conveyor 20 and a counterpart conveyor for the other harvesting mechanism at the other side of the tractor, the ears are delivered to an elevator 22 which discharges the ears into a wagon trailed behind the tractor, or to an auxiliary vehicle moving along with the tractor.

The present invention concerns the stalk ejector 18 and its cooperation with certain other elements which are constructed and operated substantially in the same manner disclosed in the Looker Patent 3,429,111, which is assigned to the assignee of the present invention. As previously indicated, and in a manner later described in detail, the stalk ejector 18 has dual functions; it will remove stalks which may break or be severed in the picking head 14 by ejecting them upwardly, counter to the normal downward movement of unbroken stalks, but will first strip the broken stalk of ears of corn which would otherwise be ejected.

An important aspect of the stalk ejector is that broken stalks and reclaimed ears of corn are removed before they can enter the screw conveyor 20, because the stalks would otherwise tend to wrap around the screw conveyor and thus occupy space intended for the ears. As a result, some ears under those conditions can be damaged beyond value, and structural damage to the screw conveyor may result. Even if the conveyor is not damaged, it will almost certainly be necessary to manually retrieve the stalks, and thereby cause a loss of useful harvesting time and productive labor.

With particular reference to FIGURES 2 and 3, the right-hand harvesting mechanism 12 includes laterally spaced, inwardly turned and forwardly declining channel members 28 and 30 that are interconnected by a lateral arm 31 which attaches to the frame of the tractor 10. A bulkhead 32 which interconnects the channels 28 and 30 is provided with bearings, not shown, that rotatably support two forwardly projecting square shafts 34 of rotors 33 and 35, respectively. Four elongate flat knives 36 are secured to each rotor shaft. The rotor shafts are each provided with a gear 37, indicated by pitch lines in FIGURE 2, that are intermeshed so that the rotors 33 and 35 rotate in opposite directions and in staggered or out of phase relation to one another.

As is known from similar prior art harvesters, the rotors 33 and 35 straddle a cornstalk and the knives 36 chop into and draw the stalk downwardly onto the ground. The knives also sever the connecting portion of the ears from the stalk when the ears reach the zone of the knives. In order to prevent the bodies of the ears from being drawn into the knives, the channels 28 and 30 support edgewise-adjustable stripper plates 38 which are spaced apart a distance slightly exceeding the diameter of the thickest corn stalks. As shown in FIGURE 4 for the rotor 35 and one stripper plate 38, the stripper plates extend rearward over the entire length of the rotors, and the slot 40 defined by the stripper plates ends at a point rearward of the stalk ejector mechanism 18. As shown in FIGURE 3, the confronting edges of the stripper plates 38 define a slot 40 to guide the stalks C along a path between the knives 36 of the rotors 33 and 35. The stripper plates arrest the ears, but allow their stalk-connecting portions to be drawn into and severed by the knives, thus leaving only the ears supported by the stripper plates.

Mounted above and to one side of each rotor 33 and 35, and extending around driven shafts 42 and idler shafts 44, are endless gathering belts 46 and 48, of the belt assemblies 16 and 17, which have sinuous folds or corrugations that cooperatively define upright moving pockets 50. The pocket portions of the gathering belts embrace the stalks and guide them into the picking head, transport the harvested ears rearwardly to the screw conveyor 20, and guide and hold the stalks and ears in generally perpendicular alignment relative to the longitudinal axis of rotation of the rotor knife assemblies 36. This latter function is initiated by the knives and will presently be described in connection with FIGURES 4–7.

The idler shafts 44 are each carried by means including a post 43 that extends upward from the associated channel 28 or 30 and carries a rigidly attached sleeve 45. Axially adjustable in the sleeve is a shaft 47 which intersects and is welded to the idler shaft 44.

The idler shafts 44 diverge upwardly from the channels 28 and 30, whereas the drive shafts 42 are perpendicular to the channels. Thus, the confronting flights of the belts 46 and 48 are parallel adjacent the drive shafts 42, but diverge upward and outward at the leading end of the harvesting mechanism to assist in funneling inward the portion of the stalk to which the ears are attached.

The belts 46 and 48 are each connected to two endless chains, indicated by pitch lines 52, that are trained around sprockets 54 mounted on the previously mentioned drive and idler shafts 42 and 44. A chain and sprocket drive train 56 is common to both belts 46 and 48, and is powered by a gear box 58 in a manner advancing the confronting flights of the belt rearward at a lineal speed slightly greater than the ground speed of the tractor 10. For example, a useful harvesting speed for the tractor 10 is approximately 2½ miles per hour, at which speed the belt speeds are approximately 2¾ miles per hour. It will thus be apparent that, in operation, the belts 46 and 48 tend to pull the cornstalks rearwardly relative to the harvesting mechanism 12.

A bedplate 60 (FIGS. 1 and 2) is supported by posts 62 from the channels 28 and 30 over the rear end portion of the belts 46 and 48, and in turn supports the stalk ejector mechanism 18, and bearings 62 (FIG. 3) that rotatably mount the upper end portions of the driveshafts 42. Secured in upright relation to the bedplate 60 are spaced, lateral walls 64 and 66 having pairs of laterally spaced, longitudinally aligned bearings 68 mounted thereon. Rotatably supported in the bearings 68 are paddle shafts 70 and 72 which are rotated in timed relation and in opposite directions by means of a gear 74 that is secured to the paddle shaft 70 and is meshed with a gear 76 of the same size on the paddle shaft 72. A chain and sprocket drive train 78 is connected to the paddle shaft 70 and to an output shaft of the gear box 58. In this manner, the paddle shafts 70 and 72 are driven in timed relation to each other at an operating speed of about 500 r.p.m. when the tractor 10 has a ground speed of about 2½ miles per hour.

The paddle shafts 70 and 72 (FIGS. 2 and 3) project forwardly of the wall 66 and each shaft carries four equiangularly spaced radial paddle blades 79 to form an integral rotor paddle 80. As shown in FIGURE 3, the paddle blades 79 interdigitate, and the underlying section of bedplate 60 is provided with a forwardly open slot 82. Thus formed, the bedplate 60 is comparable to the stripper plates 38, adjacent the knives 36, in that the slot 82 will admit upright cornstalks guided therein by diverging edge portions forming an entrance throat 84, but will restrain ears which may be attached to the stalk from moving upward beyond the bedplate. Accordingly, that portion of the bedplate at 85 underlying the paddles 80 is conveniently termed an auxiliary stripper plate.

In similar manner, the paddles 80 are comparable in function to the rotors 33 and 35 in that cornstalks which are guided into the slot 82 of the stripper plate 85 and engaged by the paddles 80 are driven endwise out of the machine. Therefore, the paddles 80 may be termed auxiliary rotors. It should be noted, however, that the only cornstalks which can become engaged with the paddles 80, are those stalks which either break above the rotors 33 and 35, or are accidentally severed at a weak spot by the rotor knives 36.

Before describing the operational sequences schematically illustrated in FIGURES 4–7, it should be noted that the rotor 33 (FIG. 3) is provided with an elongate shaft 90 which is driven, by means not shown, from the power takeoff of the tractor 10. A chain and sprocket drive train 92 delivers power from the shaft 90 to the gearbox 58 for powering all of the mechanisms previously described. At the previously mentioned ground speed of 2½ miles per hour for the tractor 10, the rotors 33 and 35 are driven at about 1100 to 1200 r.p.m.

With reference to FIGURES 4–7, the harvesting mechanism 12 is moved along a row of cornstalks at the stated approximate speed of 2½ miles per hour, at which speed the confronting flights of the gathering belts 46 and 48 are moved rearward at a speed of about 2¾ miles per hour. Therefore, when the cornstalk C is engaged by the gathering belts, the upright stalk and ears are gently gripped and held in or brought into alignment with a vertical plane midway between the rotors 33 and 35, following which the knives of the rotors cut into the cornstalk and draw it downward. Due to the rapid rotation of the rotors and the perpendicular relation of the gathering belt pockets 50 to the rotors, the cornstalk quickly assumes the general position normal to the axes of the rotors in which it is illustrated in FIGURE 4. In other words, the overall effect of the initial stalk-gripping and cutting action is to tilt the stalk forward from its upright, growing position.

If the cornstalk C is harvested in the normal manner, i.e., if the stalk does not break above the rotors 33 or 35, or become severed by the knives 36, its entire length will be drawn onto the ground before it has been traversed by the full length of the rotors 33 and 35. In so doing, the ears E will be severed from the stalk in the manner shown for the lowermost ear E in FIGURE 5; the rotor knives sever the butt or base end of the ear from the stalk. The harvested ears remain atop the stripper plates 38 and are moved rearwardly to the screw conveyor 20 (FIG. 1) by the gathering belts 46 and 48.

If the stalk C should break off above or at the rotors 33 and 35, the ears E will of course remain attached to the stalk and the entire mass will be moved by the gathering belts 46 and 48 toward the screw conveyor 20. If the broken stalk is permitted to enter the screw conveyor, the stalk will interfere with proper operation of the screw conveyor because it will occupy space intended only for ears and light debris such as leaves, and will also tend to become entwined around the conveyor flight. These conditions can not only destroy or damage the unharvested ears, but can also damage other ears and cause structural damage to the machine.

Certain prior art corn harvesting machines depend upon mechanism intended to divert stalks and/or ears from the screw conveyor or equivalent mechanism after they have been reoriented from their normal harvesting position and have progressed beyond the picking head. If the stalks and ears are for some reason not diverted, they can then foul subsequent elements of the machine. In contrast to this mode of operation, the stalk ejector mechanism 18 of the present invention removes any broken stalks and harvests their attached ears from the same area of the machine in which the normal separation of stalks and ears occurs, and while the stalks are in their normal, upright harvesting position in the picking head. Since the broken stalk and ear separation occurs in the picking head, it is also possible to provide other diverting means at a further downstream position to prevent stalks from entering the screw conveyor. However, this precaution has proved unnecessary with the stalk ejector mechanism 18.

Considering that the stalk C (FIG. 4) breaks off or is severed above the rotors 33 and 35, it is carried by the gathering belts 46 and 48, as shown in phantom lines in FIGURE 6, into the guide slot 82 of the auxiliary stripper plate 85 and thus engages the driven paddles 80 of the stalk ejector mechanism 18. Due to the close intermeshing arrangement of the paddle blades 79, the stalk is bent into sinuous form as shown at 92 (FIG. 7) as it is driven upward by the paddles 80. This bending of the stalk assures a positive driving action so that the stalk is stripped away from the ears when the ears contact the underside of the auxiliary stripper plate 85 as shown for the ear at 94 (FIGS. 6 and 7A). As the stalk continues to be driven upward by the paddles 80, each ear in turn is arrested by the auxiliary stripper plate 85 so that it becomes detached from the stalk and falls toward the subposed main stripper plates 38 to be carried rearwardly by the gathering belts in the same manner the normally harvested ears are conveyed. In order to assure that the ejected stalk does not fall between the gathering belts, deflecting means, not shown, may be provided to divert the stalk laterally away from the machine.

In summary, and by way of emphasizing the features believed to be novel, the stalk ejector mechanism 18 functions by gripping broken stalks while the stalks are oriented and maintained in the positions in which normal harvesting of the ears is effected so that the stalks remain in positive control. The stalk ejector mechanism functions in the manner of auxiliary ear harvesting mechanism operating in reverse direction to the main harvesting mechanism so that immediately following the breaking or severing of a stalk, it is gripped and driven upwardly out of the machine. Any ears attached to the stalk are arrested by stripper means underlying the stalk ejector, whereupon the ears are detached from the stalk and are deposited in the same area occupied by the normally harvested ears. Because the stalk ejecting operation occurs with the stalk in its normal harvesting position, without reorientation of the stalk, the ejecting action is predictable and positive, and the dropping ears are isolated from the rotors by the stripper plates. The stalk ejecting mechanism 18 thus provides simple, efficient and dependable means for removing broken stalks and for retaining any ears that may initially be attached to the broken stalks.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, I claim:

1. A mobile corn harvesting machine comprising a frame, dual main rotors mounted in said frame for gripping a cornstalk near the ground and pulling the stalk downward with the stalk in a generally upright position, auxiliary dual rotors spaced above said main rotors for gripping the upper end portions of broken stalks which may have been severed by the main rotors and ejecting the broken stalks upwardly from the machine, an auxiliary stripper plate in closely spaced underlying relation with said auxiliary rotors, a main stripped plate closely spaced above said main rotors and defining an elongate slot extending between the main rotors and rearwardly under said auxiliary rotors and said auxiliary stripper plate, and a pair of laterally spaced driven belts having upstanding confronting reaches overlying said main stripper plate, said confronting reaches terminating rearward of said auxiliary rotors, said belt reaches and said main stripper plate defining an upwardly open chamber arranged to receive reclaimed ears which are stripped by the stripper plate associated with said auxiliary rotors, said main stripper plate preventing the reclaimed ears from contacting said main rotors, and said belt reaches conveying said reclaimed ears rearward into the machine along with the normally harvested ears.

References Cited

UNITED STATES PATENTS

| 2,651,163 | 9/1953 | Aasland | 56—107 |
| 3,057,141 | 10/1962 | Gaunt et al. | 56—119 |
| 3,388,538 | 6/1968 | Markham | 56—119 X |

ANTONIO F. GUIDA, Primary Examiner

ROBERT F. CUTTING, Assistant Examiner

U.S. Cl. X.R.

56—17, 107, 119

PO-1050
(5/69)

UNITED STATES PATENT OFFICE
CERTIFICATE OF CORRECTION

Patent No. 3,492,797            Dated February 3, 1970

Inventor(s) B. J. SEARS

It is certified that error appears in the above-identified patent and that said Letters Patent are hereby corrected as shown below:

Column 1, line 72, "ear" should be --ears--. Column 2, line 70, should not be a new paragraph. Column 6, line 46, "stripped" should be --stripper--.

Signed and sealed this 11th day of May 1971.

(SEAL)
Attest:

EDWARD M. FLETCHER, JR.          WILLIAM E. SCHUYLER, JR.
Attesting Officer                 Commissioner of Patents